(12) United States Patent
Magdy et al.

(10) Patent No.: US 8,131,720 B2
(45) Date of Patent: Mar. 6, 2012

(54) USING AN ID DOMAIN TO IMPROVE SEARCHING

(75) Inventors: Walid Magdy, Giza (EG); Motaz El-Saban, Giza (EG)

(73) Assignee: Microsoft Corporation, Redmond, WA (US)

( * ) Notice: Subject to any disclaimer, the term of this patent is extended or adjusted under 35 U.S.C. 154(b) by 399 days.

(21) Appl. No.: 12/180,144

(22) Filed: Jul. 25, 2008

(65) Prior Publication Data

US 2010/0023497 A1  Jan. 28, 2010

(51) Int. Cl.
  *G06F 7/00* (2006.01)
  *G06F 17/30* (2006.01)
(52) U.S. Cl. ................... 707/736; 707/741; 707/755
(58) Field of Classification Search ............ 707/705, 707/736, 741, 755
  See application file for complete search history.

(56) References Cited

U.S. PATENT DOCUMENTS

| | | | |
|---|---|---|---|
| 5,757,983 A | 5/1998 | Kawaguchi et al. | |
| 5,825,943 A * | 10/1998 | DeVito et al. ................. | 382/306 |
| 5,867,277 A | 2/1999 | Melen et al. | |
| 6,002,798 A | 12/1999 | Palmer et al. | |
| 6,745,202 B2 * | 6/2004 | Takahashi et al. ............ | 707/740 |
| 7,089,532 B2 | 8/2006 | Rubin | |
| 7,349,896 B2 | 3/2008 | Chowdhury et al. | |
| 7,865,817 B2 | 1/2011 | Ryan et al. | |
| 2001/0021029 A1 * | 9/2001 | Takaoka ......................... | 358/1.9 |
| 2002/0095410 A1 * | 7/2002 | Takahashi et al. ............ | 707/3 |
| 2004/0255218 A1 * | 12/2004 | Tada et al. ..................... | 714/747 |
| 2006/0020607 A1 * | 1/2006 | Patterson ....................... | 707/100 |
| 2007/0150451 A1 | 6/2007 | Brei | |
| 2007/0288660 A1 * | 12/2007 | Marmor ......................... | 709/246 |
| 2008/0063279 A1 * | 3/2008 | Vincent et al. ................ | 382/182 |
| 2008/0181505 A1 * | 7/2008 | Wu et al. ....................... | 382/190 |
| 2008/0273796 A1 * | 11/2008 | Kansal et al. ................. | 382/176 |
| 2009/0148048 A1 * | 6/2009 | Hosomi ......................... | 382/190 |

FOREIGN PATENT DOCUMENTS

WO  WO2007113585  10/2007

OTHER PUBLICATIONS

Marinai et al., "Font Adaptive Word Indexing of Modern Printed Documents", IEEE, Aug. 2006, pp. 1187-1199. Download: http://www.computer.org/portal/web/csdl/doi/10.1109/TPAMI.2006.162.*

(Continued)

*Primary Examiner* — Hares Jami
(74) *Attorney, Agent, or Firm* — Lee & Hayes, PLLC

(57) ABSTRACT

Methods which use an ID domain to improve searching are described. An embodiment describes an index phase in which an image of a document is converted into the ID domain. This is achieved by dividing the text in the image into elements and mapping each element to an identifier. Similar elements are mapped to the same identifier. Each element in the text is then replaced by the appropriate identifier to create a version of the document in the ID domain. This version may be indexed and searched. Another embodiment describes a query phase in which a query is converted into the ID domain and then used to search an index of identifiers which has been created from collections of documents which have been converted into the ID domain. The conversion of the query may use mappings which were created during the index phase or alternatively may use pre-existing mappings.

6 Claims, 9 Drawing Sheets

OTHER PUBLICATIONS

Marinai et al., "Indexing and retrieval of words in old documents", IEEE, Aug. 2003, pp. 1-5. Download: http://ieeexplore.ieee.org/stamp/stamp.jsp?tp=&arnumber=1227663.*

Marinai et al., "Indexing and retrieval of words in old documents", 7th International Conference on Document Analysis and Recognition (ICDAR 2003), Edinburgh, Scotland, Aug. 3-6, 2003, 5 pages.

Betzel, et al "Retreving OCR Text: A Suvey of Current Appoaches", retrieved at <<http://ir.iit.edu/publications/downloads/SIGIR-OCR-2002.pdf>>, Department of Computer Science, Illinois Institute of Technology, pp. 1-5.

Callan, et al, "Information Retrieval and OCR: From Converting Content to Grasping Meaning", retrieved at <<http://www.sigir.org/forum/F2002/callan.pdf>>, pp. 1-4.

Jones, et al, "Examining the Effectiveness of IR Techniques for Document Image Retrieval", retrieved at <<http://citeseer.ist.psu.edu/cache/papers/cs/26691/http:zSzzSzhartford.lti.cs.cmu,eduzSzcallanzSzWorkshopszSzIR-OCR-02zSzexe-sigir-ocr-wksp.pdf/jones02examining.pdf>>, Department of Computer Science, pp. 1-10.

Wechsler, et al, "Multi-Language Text Indexing for Internet Retrieval", retrieved at <<http://citeseer.ist.psu.edu/cache/papers/cs/6218/http:zSzzSzwww-ir.inf.ethz.chzSzDELOSzSzSheridanzSzsheridan-deloszSzriao97.pdf/multi-language-text-indexing.pdf>>, Swiss Federal Institute of Technology (ETH), pp. 1-16.

* cited by examiner

USING AN ID DOMAIN TO IMPROVE SEARCHING

BACKGROUND

Many printed documents are being digitized so that their content can be searched. Optical character recognition (OCR) is the main process used to digitize printed text and involves recognition of printed characters and conversion of the recognized characters to ASCII code. The resultant code can be searched as text. There are a number of factors which can cause problems in the performance of OCR and can result in misrecognition and these include poor image resolution, the scanned paper quality and font shape. Additionally, some languages have very challenging orthographic features which lead to poor results with OCR. Such languages include Arabic, Urdu, Pashto etc. Poor results from OCR lead to reduced effectiveness in information retrieval (IR) when searching the text.

A number of solutions have been proposed to address the problem of performing IR from printed texts. Some of these solutions address IR effectiveness on OCR output, for example using query degradation based on a character error model of the recognized text or by finding the best index term for the degraded text. Other solutions have looked at performing text correction on the OCR output. However, these solutions are not effective when error rates in the original OCR process are high.

An alternative approach is to perform the search in the image domain, rather than the text domain, which avoids the need to perform OCR. In such an approach, the text query is converted into an image query and then the document image is searched for occurrences of the image query. Whilst this approach can achieve better results for documents that result in high error rates in OCR, performing image searches requires a large amount of processing power and as a result is not scalable to large collections of documents.

The embodiments described below are not limited to implementations which solve any or all of the disadvantages of known methods of performing IR from printed text.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods which use an ID domain to improve searching are described. An embodiment describes an index phase in which an image of a document is converted into the ID domain. This is achieved by dividing the text in the image into elements and mapping each element to an identifier. Similar elements are mapped to the same identifier. Each element in the text is then replaced by the appropriate identifier to create a version of the document in the ID domain. This version may be indexed and searched. Another embodiment describes a query phase in which a query is converted into the ID domain and then used to search an index of identifiers which has been created from collections of documents which have been converted into the ID domain. The conversion of the query may use mappings which were created during the index phase or alternatively may use pre-existing mappings.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
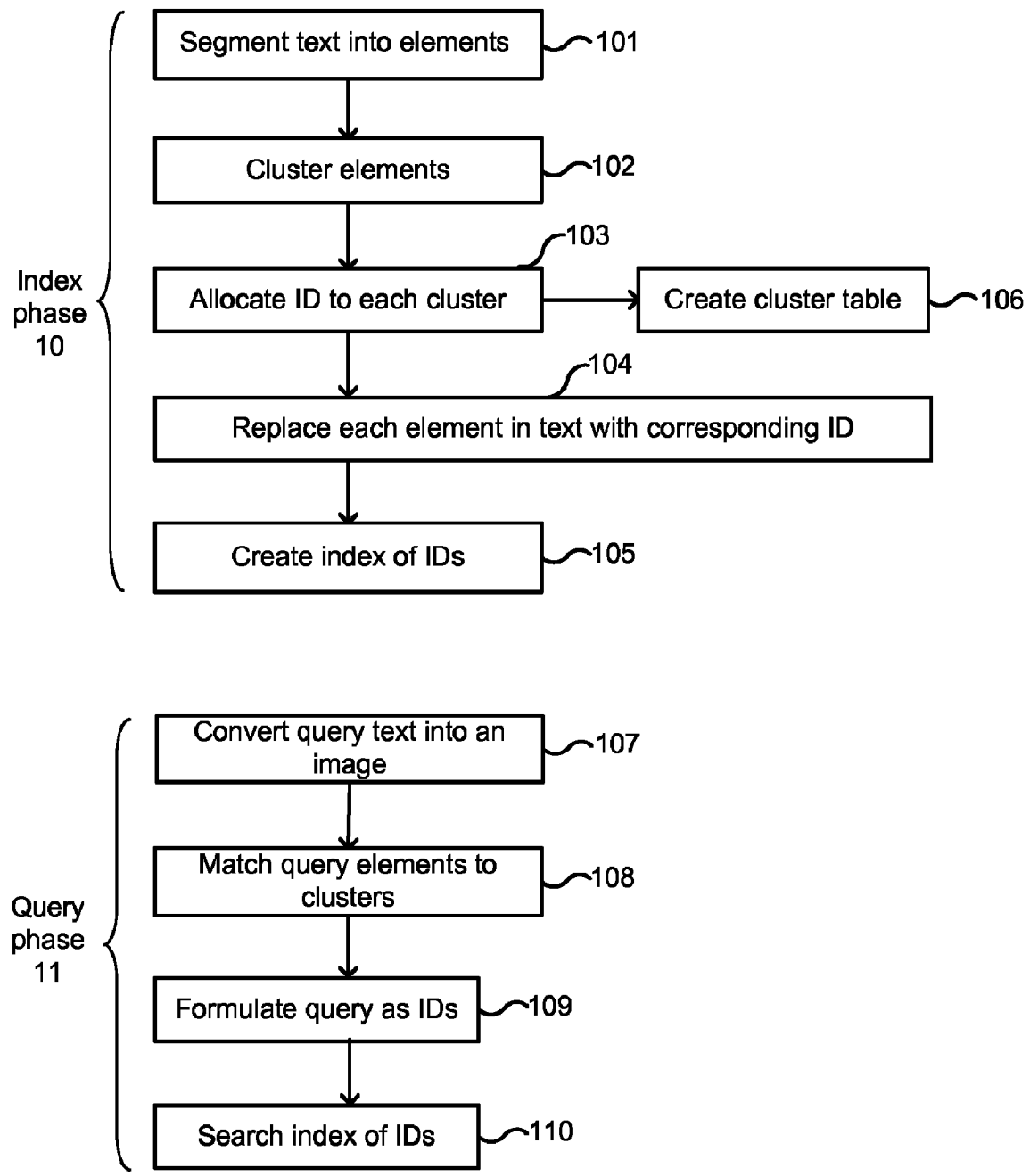
FIG. 1 is a flow diagram of an information retrieval method.

FIG. 1 is a flow diagram of an information retrieval method which uses a third domain, referred to herein as the 'ID domain', to perform the searching. The method has two phases: the index phase 10 and the query phase 11. The index phase 10 converts the document image to be searched into the ID domain whilst the query phase 11 converts the query into the ID domain and then performs the search. The index phase 10 may be performed off-line (i.e. before the IR query is received).

The methods below are described as being used to search printed text. This is by way of example only and the methods may be used to search any image of a document or piece of text. The image may be any suitable file format. In many situations, this image may have been created by imaging (e.g. scanning) printed material; however in some situations a printed copy may not necessarily exist (e.g. searching of document images which are made available on the Internet and which may have been generated from an electronic original).

The index phase 10 involves segmenting the image of the printed text (e.g. a scanned image) into elements (block 101), where each element may represent a character or a part of a word and this segmentation may be performed in any way. For example, where the text is in English, each element may comprise a single character (e.g. a, b, c etc), a part of a word, a word or a connected component. Where the text is in Arabic, each element may comprise a part of an Arabic word (PAW), a word, a character etc. There are many known segmentation techniques which may be used to divide the image of the printed text into elements. The elements are then grouped into clusters (block 102). The clustering may be based on visual similarity (e.g. using pattern matching) and may use any of the known clustering techniques such as k-means clustering or k-median clustering. Other features may also be used in clustering, e.g. element width. In an example of the clustering process, where the text is in English, there may be a cluster for each of a, b, c, . . . , A, B, C, . . . etc. Where characters are visually similar, e.g. an upper case letter o, 'O' and a zero '0' or a lower case L, 'l' and an upper case i, 'I', these characters are likely to be placed in the same cluster. Each cluster is associated with a unique ID (block 103), which may, for example be a numerical value. Each element in the text is then replaced with its corresponding ID (block 104) and the text, as now represented by a set of IDs, is indexed (block 105).

Figure 6:
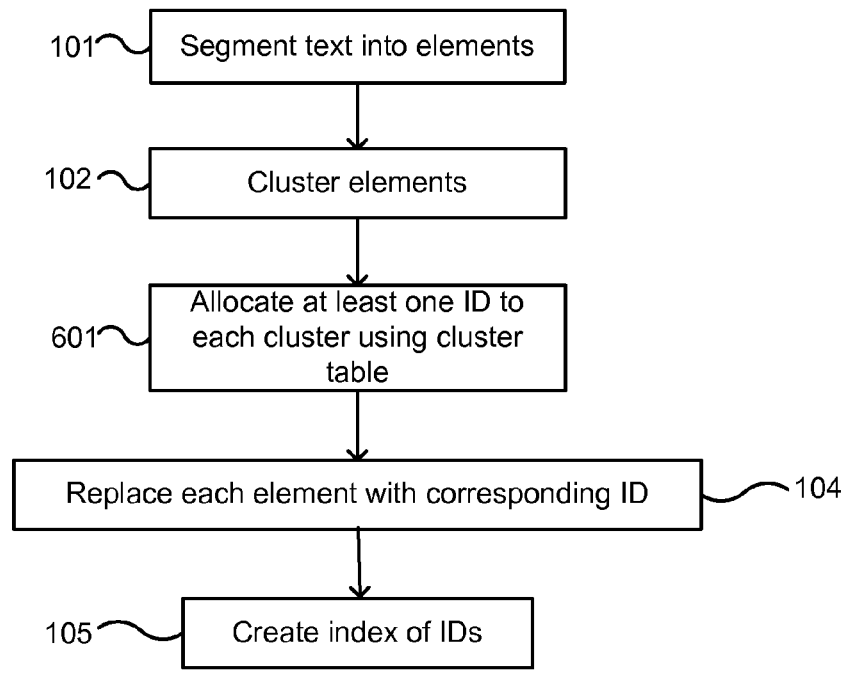
FIG. 6 comprises two flow diagrams of two further example implementations of the index phase.
Figure 6:
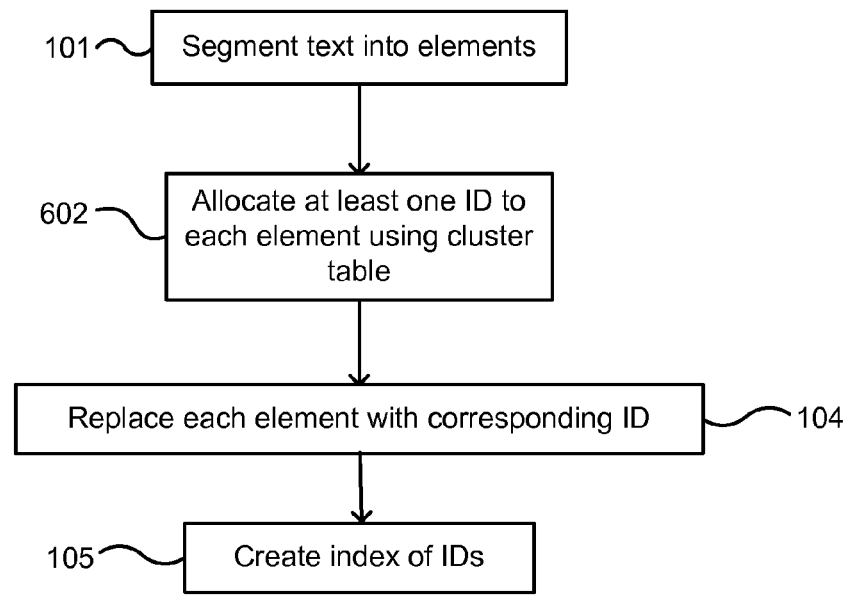

As described above, one output of the index phase 10 is an index of IDs (as generated in block 105). Additionally, a table of clusters may be generated (block 106). The table of clusters provides a mapping between a unique ID for a cluster and a representative group of features of an element in the cluster, or a set of representative groups of features of elements in the cluster (where this set may comprise all of the elements in the cluster). These features can be the mean or median image of the elements (shapes) in the cluster. In an example, the representative image of a cluster containing both the capital letter 'O' and zero '0' may be a character which is broader than the zero but not at broad as the capital letter O. The table of clusters (generated in block 106) may be used to convert a text query into the ID domain in the query phase 11, as described below. In an alternative method, a cluster table may already exist (e.g. a pre-existing cluster table for the font used in the printed text) and this may be used (in block 103) to allocate an ID to each cluster. An example of such an alternative method is shown in FIG. 6 and described below.

The query phase 11 involves converting a text query into an image (block 107). The query is drawn with the most similar font to that of the document images. Font of the document can be detected manually or automatically (e.g. in most cases in libraries, each book has an associated metadata file that contains information about the book title, author and font). The image of the query is then divided into elements (in a corresponding manner to block 101 described above) and each element is matched to a cluster in the cluster table (block 108). As described above, the cluster table may be generated during the index phase (in block 106) or may have previously been generated. Use of the cluster table and the matching process (in block 108) enables the query to be reformulated in terms of IDs (block 109), e.g. the query 'House' may be reformulated as '23 3 24 11 2' based on a cluster table which maps elements to IDs as follows: 'H' to ID 23, 'o' to ID 3 etc. This query, which is now in the ID domain, can then be used to search the index of IDs (block 110, where the index was generated in block 105).

The output of the query phase 11 may be ranked set of results, where the results may be documents (selected from a collection of documents which have been indexed and searched) or parts of documents (selected from one or more documents which have been indexed and searched). The ranking may use any ranking technique, e.g. inverse document frequency.

The method shown in FIG. 1 does not require OCR and therefore avoids problems caused by OCR errors. Use of the ID domain improves IR performance for documents that suffer from low quality of recognized text in OCR, e.g. documents in languages with complex orthography such as Arabic. Furthermore, searching in the ID domain is much faster than searching images. The technique also provides flexibility in constructing the query and in some examples, a set of synonyms may be used (as described in more detail below) which can result in improved recall. The method is also language independent.

Figure 2:
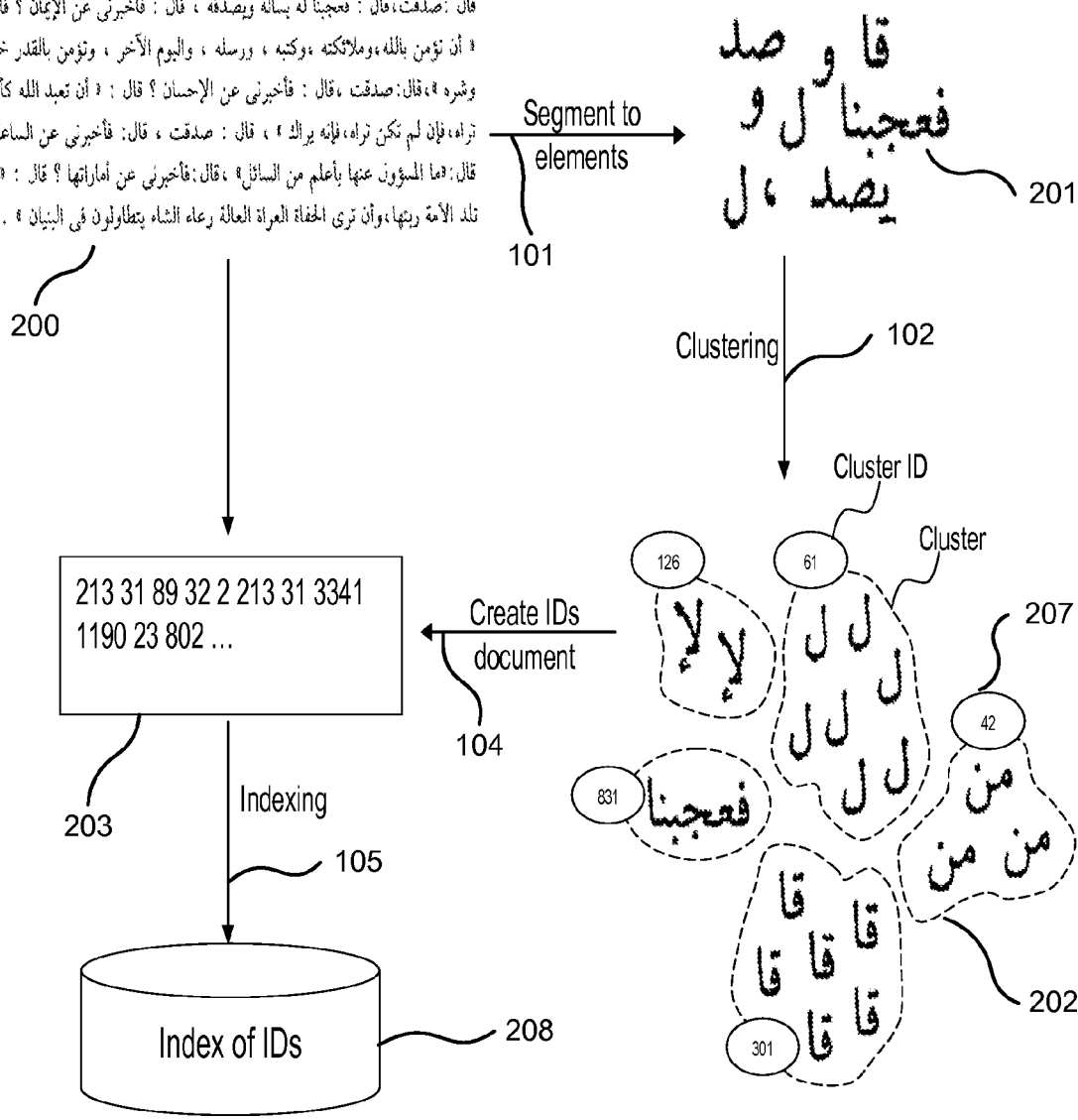
FIGS. 2 and 3 show an example of applying the method of FIG. 1 to an Arabic document.
Figure 3:
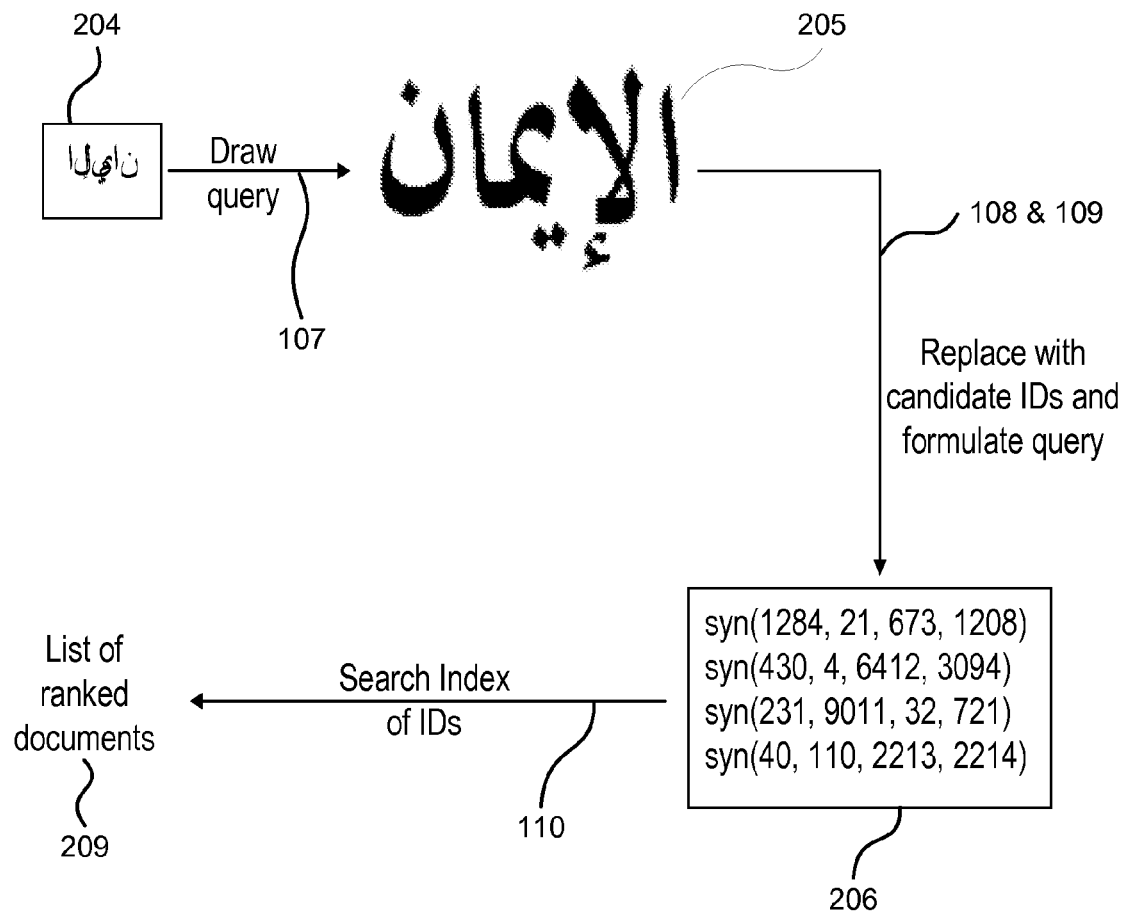

FIGS. 2 and 3 show an example of applying the method described above to an Arabic document. FIG. 2 shows the index phase and FIG. 3 shows the query phase. The arrows in FIGS. 2 and 3 have been labeled with reference numerals which correspond to the method blocks shown in FIG. 1. The method is applied to an image of a document 200, which may, for example, be one of a set of image documents. The image of the document 200 is segmented into a large number of elements 201 (block 101). In this example, each element comprises a PAW, although in other examples, elements may be selected differently. Each of the elements are then grouped to form a set of clusters 202 (block 102), where each cluster comprises elements which are similar. Each cluster has a unique ID 207 and each cluster can be represented by some or all of its elements, through features of its elements (such as the mean image) or any other method that can be used to represent the content of a cluster. A document in the ID domain 203 is then constructed by replacement of each element in the input document 200 with its corresponding ID (block 104). The document in the ID domain 203 can then be indexed as if it were text (block 105) to create an index of IDs 208. The index phase may be repeated for other documents.

In the query phase 11, as shown in FIG. 3, a query 204 is received, for example by a user typing the query into a search tool. This query 204 is then converted (block 107) to an image 205 with a similar font to that used in the document which is being searched (document 200 in this example). This image 205 may be referred to as an image query. A cluster table (which may have been generated in the index phase) is used to find the best matching clusters for each element in the image query (block 108) and each element is replaced with the IDs of one or more of the best matching clusters to create a query 206 in the ID domain (block 109). This query 206 in the ID domain is suitable for searching the index of IDs 208 (block 110) in order to return a list of relevant documents 209 (or portions of relevant documents).

In the example shown in FIG. 3, each element in the query is replaced with the IDs of the four best matching clusters, as indicated by 'syn (1284, 21, 673, 1208)' where the numbers 1284, 21, 673 and 1208 are the IDs of the four best matching clusters for one of the elements and may be considered to be synonyms. The ability to replace an element in an image query with more than one ID may be particularly useful where more than one cluster contains elements which are very similar. For example, in English, 'e' and 'c' may be considered similar and this may be dependent upon the font used or particular handwriting. In such an example, a query 'eat' may be replaced with the IDs for both 'e', 'a', 't' and 'c', 'a', 't'. In another example, a distorted element may be replaced with more than one ID. Each of the IDs identified can then be used in searching the index of IDs 208 (in block 110).

In general, an element may be replaced by the IDs of the best N matched clusters, where N may be any positive integer value. Typically a value of between 5 and 10 may be used for N: a large value of N results in reduced precision and may result in too many hits when searching, whilst a small N gives good precision but may result in low recall. In some examples the value of N may be selectable by a user or a user may be able to select factors which influence the value of N. Other techniques may be used to select the value of N or the number of IDs which are used to replace any element in an image query and this number may be variable (i.e. different for different elements and/or different for different searches). A number of examples are described below. Use of synonyms provides flexibility in constructing a query. This leads to improved information retrieval in the system.

In a first example, the value of N for each element being replaced may be selected based on the magnitude of the difference between clusters. For example, when an element is compared to the table of clusters, the distance (in image space) between the element and each cluster may be computed e.g. using standard techniques to compute an image distance (e.g. Euclidian distance). If the best cluster has a distance d, all clusters within a distance of 2d (or $\alpha$d, where $\alpha$ is a specified parameter) may be considered to be synonyms of the element.

In another example, weighted synonyms may be used. In such an example, each synonym may be weighted according to a matching score, such as its distance from the element (and/or other factors) and many synonyms may be considered, with synonyms of low weight ranked lower than synonyms with a higher weight.

The image distance may be used to group elements into clusters (in block 102). For example, elements may be considered to be part of the same cluster if the distance between them is less than a threshold value, D.

Figure 4:
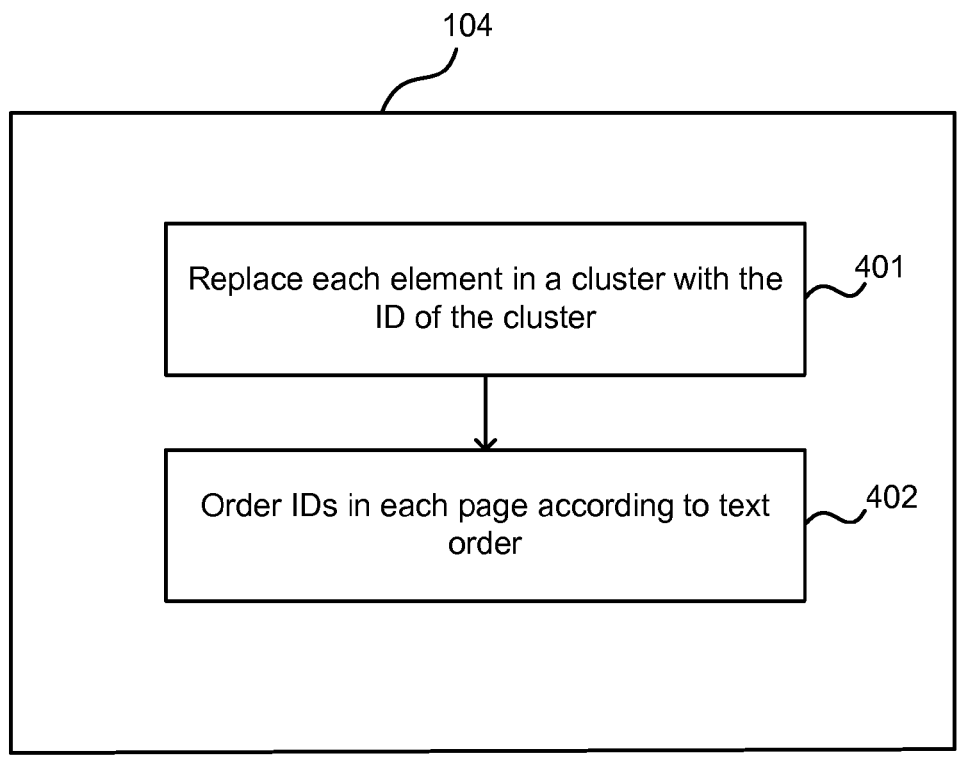
FIGS. 4 and 5 show example implementations of method steps from FIG. 1 in more detail.

FIGS. 1 and 2 show the method block of replacing each element in the text with a corresponding ID as a single step (block 104). In some examples, however, this may be a two stage process, as shown in FIG. 4. In this example, each element in a cluster is replaced with the ID of a cluster (block 401) and then the IDs are ordered according to the text order in each page (block 402). This ordering process (in block 402) is language dependent, for example, in English IDs are ordered according to the element's position from left to right and top to bottom, while for languages such as Arabic, IDs will be ordered from right to left and top to bottom. Other languages may use the same or different ordering schemes.

Figure 5:
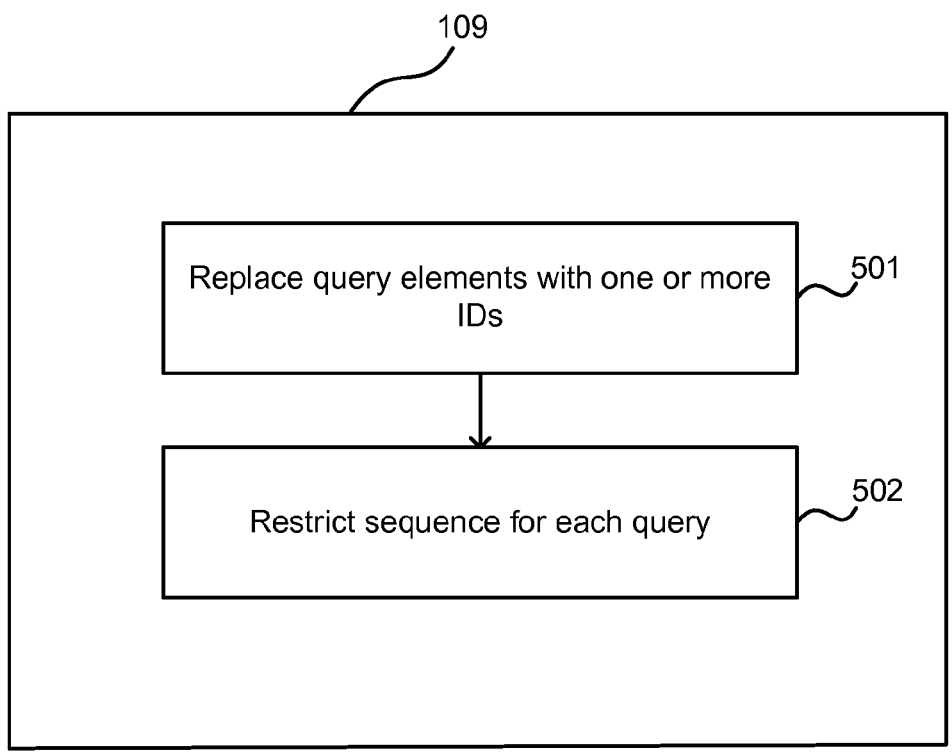

FIGS. 1 and 2 also show the method block of formulating a query from IDs as a single step (block 109). In some examples, the method block may involve two discrete steps, as shown in FIG. 5. In this example, each element in a cluster is replaced with one or more IDs of clusters (block 501) and then the sequence for each query is restricted (block 502). This restriction of the sequence (in block 502) is analogous to placing inverted commas around a search string in an internet search engine, e.g. "1 2 38 09" and restricts the search to a particular order of IDs (e.g. to search for 'eat' and not 'eta', 'ate' etc.).

FIG. 3 shows an example of a query element being replaced by more than one ID in the query phase. A similar technique may be applied in some circumstances in the index phase and this is shown in FIG. 6. FIG. 6 shows a flow diagram of another two example methods of implementing the index phase. These methods use a pre-existing cluster table (in block 601 or 602) to convert the elements to IDs. In a first method (blocks 101, 102, 601, 104, 105), the input document is segmented into elements (block 101) and the elements are grouped into clusters (block 102), as described above. In order to map from elements to IDs (in block 601) the pre-existing cluster table is used and each cluster is allocated an ID of the most similar cluster in the cluster table. Where there is more than one similar cluster in the cluster table, a cluster may be allocated one ID (corresponding to the best match cluster) or more than one ID. The method then proceeds as described above, with each element in the input document being replaced by the corresponding ID (or IDs, where a cluster is allocated more than one ID) and an index of IDs being created (blocks 104-105).

In the other method (blocks 101, 602, 104, 105), also shown in FIG. 6, after the input document has been segmented into elements (in block 101), each element is allocated at least one ID using the pre-existing cluster table (block 602). This method does not cluster elements prior to allocating IDs, but instead allocates IDs on an element by element, rather than cluster by cluster, basis. This may provide additional flexibility where there are misshapen elements; however it may be slower than the cluster by cluster approach. Again, as described above, each element may be replaced by one ID or by multiple IDs where the element is similar to a number of clusters in the pre-existing cluster table. The method then proceeds as described above, with each element in the input document being replaced by the corresponding ID (or IDs, where an element is allocated more than one ID) and an index of IDs being created (blocks 104-105).

Figure 7:
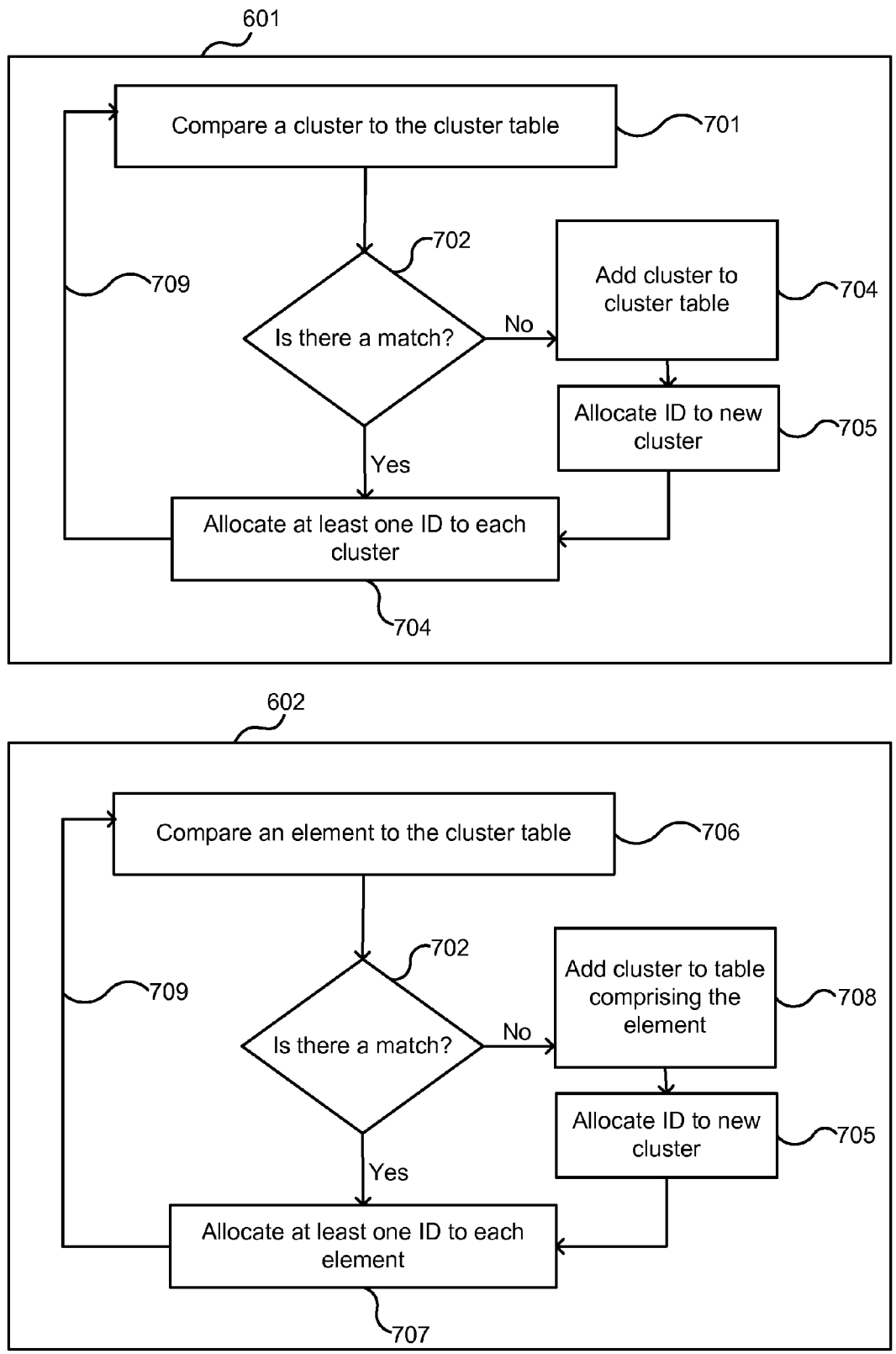
FIG. 7 shows example implementations of method steps from FIG. 6 in more detail.

In a variation of the methods shown in FIG. 6, where an element or a cluster of elements does not match (or is not similar enough to) any cluster in the pre-existing cluster table, rather than allocating one or more IDs of the most similar existing clusters in the cluster table, the cluster table may be updated, e.g. as shown in FIG. 7. Each cluster/element is compared to the pre-existing cluster table (blocks 701 and 706) and if there is a match ('Yes' in block 702), at least one ID is allocated to each cluster/element (blocks 703 and 707). If, however, there isn't a match with an entry in the pre-existing cluster table ('No' in block 702), a new cluster is added to the cluster table (blocks 704 and 708) where the new cluster comprises the cluster/element for which no match was found (in block 702). A new ID is then allocated to the new cluster (block 705) and at least one ID is allocated to each cluster/element (blocks 703 and 707). The process is then repeated for each cluster/element (as indicated by arrow 709). Any suitable criteria may be used (in block 702) to determine what constitutes a match. In an example Euclidean distance between elements' images may be used (e.g. image distance less than a threshold value).

As described above, the query phase 11 involves converting a text query into an image (in block 107) and this may be achieved by drawing the text query using a font which is the same as the font used in the printed text. Where there is no exact font, the closest font may be used or alternatively a combination of fonts may be used. Where multiple fonts are used, the query phase may be performed once for each font and this may be done in parallel or serially. For example, the query text is converted into an image using each of the different fonts identified (in block 107) and then each image query is segmented and elements are matched to clusters using a cluster table (in block 108). A different cluster table may be used for each font or alternatively a single cluster table (e.g. which was generated in the index phase) may be used for all of the fonts. In either case, each font may result in a different query formulated in the ID domain (in block 109) and each query is used to search the index of IDs (in block 110). The results which are obtained for each font may be presented individually to a user, or alternatively the sets of results may be combined (e.g. in a similar manner to that shown in FIG. 8) and the combined results presented to a user. The closest font(s) to use may be identified manually or may be identified automatically (e.g. using pattern matching between a font template and the input document). Again criteria may be used to define the maximum number of different fonts which may be used.

Figure 8:
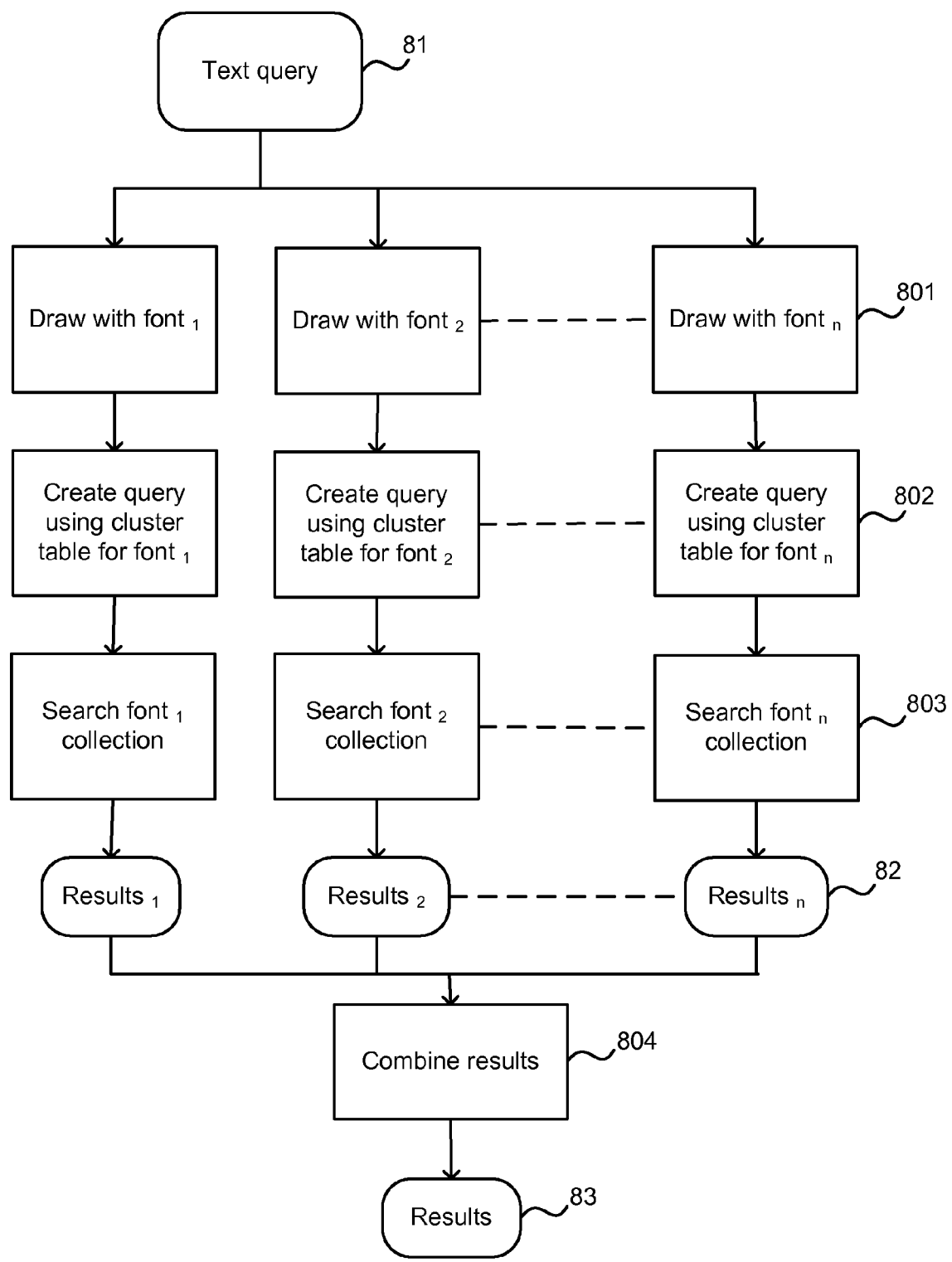
FIG. 8 is a flow diagram an example implementation of the query phase.

In an embodiment, the index phase 10 is performed off-line and many documents may be indexed to form a collection (or library) of indexed documents in the ID domain. The query phase may be totally disconnected from the index phase and some documents may be indexed but not subsequently searched. In some situations, different documents within a collection may use different fonts and therefore when searching the entire collection, the query text may be converted into image queries using each of the fonts. An example of such a method is shown in FIG. 8. A text query 81 is drawn in each of the fonts (font n) which are used in the library (block 801). A query for each font is then created using a cluster table for the particular font (block 802) and this query (which may comprise multiple sub-queries, as described above) is used to search the part of the library which uses the particular font (block 803). Search results (results n 82) are therefore obtained for each of the fonts and these may be combined (in block 804) to create a single set of results 83. In an example there may be 20 different fonts (n=20) and therefore 20 different cluster tables.

The methods described above may be implemented as a standalone software tool or may be integrated into another application, such as an internet browser or Microsoft® Office OneNote.

Figure 9:
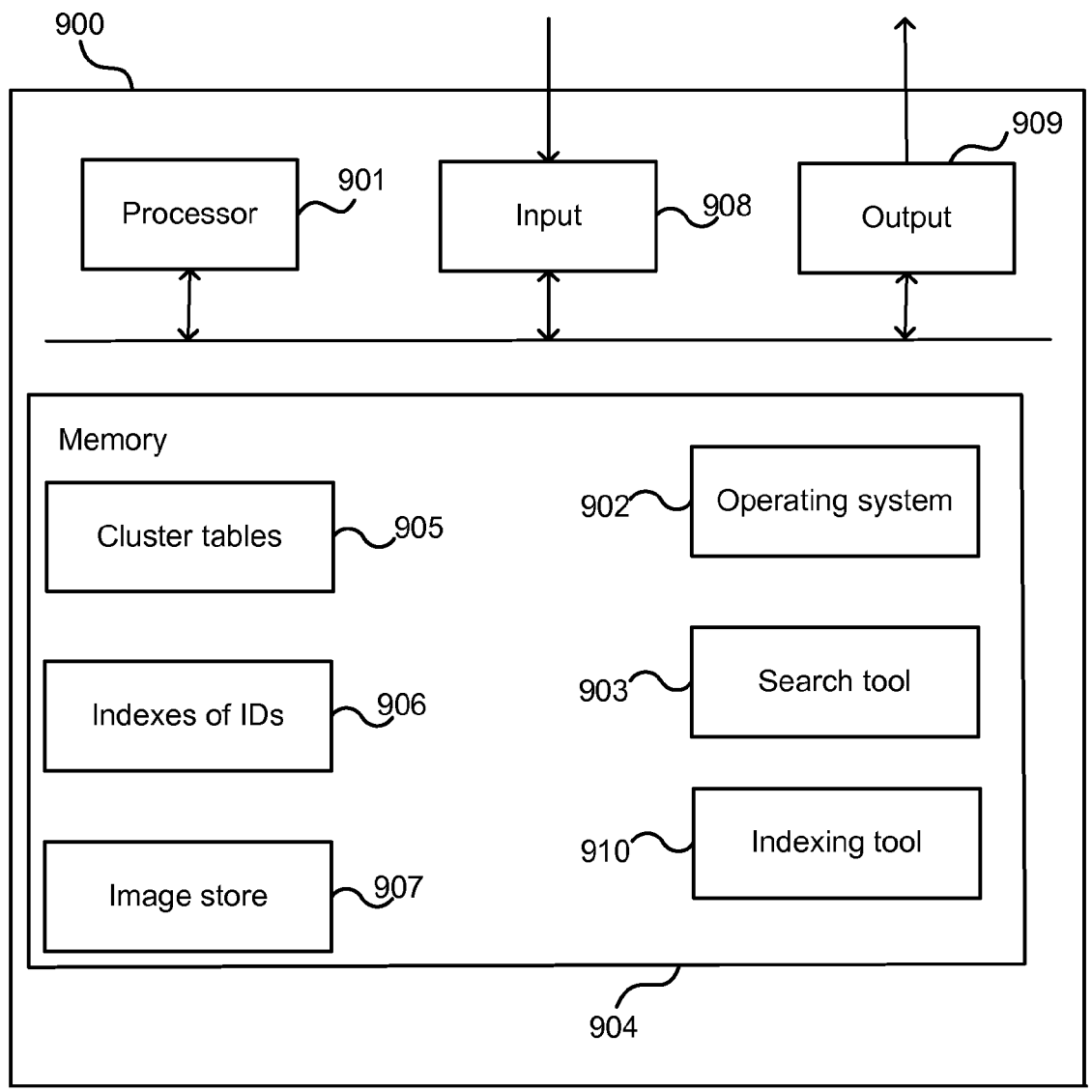
FIG. 9 illustrates an exemplary computing-based device in which embodiments of the methods described herein may be implemented.

FIG. 9 illustrates various components of an exemplary computing-based device 900 which may be implemented as any form of a computing and/or electronic device, and in which embodiments of the methods described above may be implemented.

Computing-based device 900 comprises one or more processors 901 which may be microprocessors, controllers or any other suitable type of processors for processing computing executable instructions to control the operation of the device in order to perform the indexing and/or querying methods described above. Platform software comprising an operating system 902 or any other suitable platform software may be provided at the computing-based device to enable application software, such as a search tool 903 and/or an indexing tool 910, to be executed on the device.

The computer executable instructions may be provided using any computer-readable media, such as memory 904. The memory is of any suitable type such as random access memory (RAM), a disk storage device of any type such as a magnetic or optical storage device, a hard disk drive, or a CD, DVD or other disc drive. Flash memory, EPROM or EEPROM may also be used. The memory may also be used to store cluster tables 905, indexes of IDs 906 and the document images 907.

The computing-based device 900 also comprises one or more inputs 908 which may be used to receive the text query and/or the document images which are to be searched. The inputs 908 may include inputs from user input devices and inputs from a network and the inputs may be of any suitable type for receiving user input, media content (e.g. document images), Internet Protocol (IP) input, etc. An output 909 is also provided such as an audio and/or video output to a display system integral with or in communication with the computing-based device (e.g. for display of the results). The display system may provide a graphical user interface, or other user interface of any suitable type. The device 900 may also comprise a network interface (not shown in FIG. 9) to enable the device to be connected to a network such as the Internet or an intranet.

Although the present examples are described and illustrated herein as being implemented in a single computing device (as shown in FIG. 9), the system described is provided as an example and not a limitation. As those skilled in the art will appreciate, the present examples are suitable for application in a variety of different types of computing systems, e.g. in a client-server architecture, as a distributed computing system, as a web-service etc.

Although the methods are described above using IR from document images as an example application, the techniques may also be applied to handwriting recognition and/or searching of handwritten notes, where the notes may have been created on paper or using a tablet PC (or similar device). In such an instance the font used in the query phase may be the particular handwriting and the query image may be manually drawn by the user (e.g. where a user is searching their own handwritten notes).

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A system comprising:
   a processor;
   an input for receiving a query; and
   a memory arranged to store executable instructions arranged to cause the processor to:
   convert the query into an image;
   perform a comparison between elements in the image to a cluster table associated with a font, the cluster table defining mappings between image elements and identifiers associated with the image elements;
   create a query defined in terms of identifiers based on the comparison between elements of the image and the cluster table associated with the font; and
   search an index of identifiers created from at least one document image using the query defined in terms of identifiers based on the comparison between elements of the image and the cluster table associated with the font;
   divide text in an image of a document into a plurality of elements;
   arrange the plurality of elements into clusters of similar elements;
   allocate a unique one of the identifiers to each cluster;
   order the identifiers according to an order of a language of each page of the text;
   replace each element in the image of the document with one or more identifiers, one of the one or more identifiers comprising the identifier corresponding to the unique identifier of the cluster comprising the element; and
   create an index of identifiers in the image of the document.

2. The system according to claim 1, wherein the query is created by replacing each element in the image with at least one identifier based on the comparison.

3. The system according to claim 2, wherein the query is created by replacing each element in the image with N identifiers corresponding to the N most similar image elements in the cluster table.

4. The system according to claim 3, wherein each of said N identifiers has an associated weight and wherein the search of an index of identifiers uses the query defined in terms of identifiers and the weight associated with each of the identifiers.

5. The system according to claim 1, wherein the memory is further arranged to store executable instructions arranged to cause the processor to:
   convert the query into another image using another font different from the font;
   create another query defined in terms of identifiers based on a comparison between elements of the other image and a cluster table associated with the other font different from the font; and
   search another index of identifiers created from at least one document image using the other query defined in terms of identifiers based on the comparison between elements of the other image and the cluster table associated with the other font different from the font.

6. The system according to claim 1, wherein the query defined in terms of identifiers is created by:
   replacing each element in the image with at least one identifier based on the comparison; and
   creating a query comprising a restricted sequence of identifiers.

* * * * *